US007261082B2

(12) United States Patent
Kondo

(10) Patent No.: US 7,261,082 B2
(45) Date of Patent: Aug. 28, 2007

(54) THROTTLE VALVE CONTROL DEVICE

(75) Inventor: Yasushi Kondo, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/518,251

(22) Filed: Sep. 11, 2006

(65) Prior Publication Data

US 2007/0056558 A1 Mar. 15, 2007

(30) Foreign Application Priority Data

Sep. 13, 2005 (JP) ............................ 2005-264810

(51) Int. Cl.
*F02D 9/08* (2006.01)
*F16H 55/17* (2006.01)

(52) U.S. Cl. ........................................ 123/337; 74/438

(58) Field of Classification Search ................ 123/337, 123/376, 399, 400; 74/438, 413, 421 R, 74/421 A, 437

See application file for complete search history.

(56) References Cited

U.S. PATENT DOCUMENTS 4,259,809 A * 4/1981 Mabuchi et al. .............. 446/58
4,825,727 A * 5/1989 Komuro ....................... 74/413
5,588,328 A * 12/1996 Nihei et al. .................... 74/409
5,951,274 A * 9/1999 Bellemann et al. ......... 418/126
6,405,782 B1 * 6/2002 Cheng .................. 160/168.1 P
2003/0196640 A1 * 10/2003 Saito et al. ................. 123/399

FOREIGN PATENT DOCUMENTS

JP 2005-098178 4/2005
JP 2005-120897 5/2005

* cited by examiner

*Primary Examiner*—John T. Kwon
(74) *Attorney, Agent, or Firm*—Bacon & Thomas, PLLC

(57) ABSTRACT

To make a throttle valve control device compact, by reducing a longitudinal directional length H and a side directional length L of a gear part comprising a motor gear, an intermediate gear and a drive gear, so as to improve mountability on a two-wheeled vehicle, a drive gear Ka is provided at a throttle valve shaft 3, a motor gear Ma is provided at a motor M, the motor gear Ma is geared with a large diameter gear Nb of an intermediate gear Na, the drive gear Ka is geared with a small diameter gear Nc of the intermediate gear Na, the large diameter gear Nb of the intermediate gear Na is formed as an internal gear Nf, and the motor gear Ma is geared with the internal gear Nf which is the large diameter gear Nb.

2 Claims, 3 Drawing Sheets

THROTTLE VALVE CONTROL DEVICE

BACKGROUND OF THE INVENTION

1. Field of the Invention

The present invention relates to a throttle valve control device for controlling air amount supplied to an internal combustion engine, and more particularly, relates to a throttle valve control device in which a throttle valve is opened/closed by a motor.

2. Description of the Conventional Art

A first example of a conventional throttle valve control device has been indicated in Japanese Patent Application Laid Open No. 2005-98178.

According to this example, an intake passage is provided through at an inner part of a throttle body, and a throttle valve is mounted on a throttle valve shaft, which crosses the intake passage and is rotatably supported to the throttle body. Accordingly, the throttle valve shaft is rotated so as to control opening/closing of the intake passage by the throttle valve.

Further, a drive gear comprising a spur gear is fixedly mounted on an end part of the throttle valve shaft.

Further, a motor is housed and provided in the throttle body, and a motor gear comprising a spur gear is mounted on an output shaft of the motor.

Further, an intermediate gear for transmitting the rotation from the motor gear to the drive gear while reducing a speed is formed in two stages with a large diameter gear comprising a spur gear and a small diameter gear comprising a spur gear, and the large diameter gear and the small diameter gear are formed along the axial direction. The motor gear is geared with the large diameter gear of the intermediate gear, and the drive gear is geared with the small diameter gear of the intermediate gear.

Accordingly, rotation of the motor is transmitted to the intermediate gear from the motor gear through the large diameter gear, and rotation of the intermediate gear is transmitted to the drive gear through the small diameter gear, and thereby, the throttle valve is opened/closed by the motor.

Further, as described above, rotation of the motor is reduced at the first stage by the motor gear and the large diameter gear of the intermediate gear, and reduced at the second stage by the small diameter gear of the intermediate gear and the drive gear.

A second example of a conventional throttle valve control device has been indicated in Japanese Patent Application Laid Open No. 2005-120897.

According to this example, rotation of the motor is transmitted to the intermediate gear from the motor gear through the large diameter gear, and rotation of the intermediate gear is transmitted to the drive gear through the small diameter gear, and the thereby, the throttle valve is opened/closed by the motor, like the above-described first example.

SUMMARY OF THE INVENTION

According to such the conventional throttle valve control device, a gear part G consists of a motor gear Ma, an intermediate gear Na including a large diameter gear Nb and a small diameter gear Nc, and a drive gear Ka, and shaft centers of these gears are provided as follows.

According to the first example of the conventional throttle valve control device (indicated in Japanese Patent Application Laid Open No. 2005-98178), a shaft center Ma1 of the motor gear Ma, a shaft center Na1 of the intermediate gear Na including the large diameter gear Nb and the small diameter gear Nc, and a shaft center Ka1 of the drive gear Ka are provided on the same straight line X-X. These are illustrated in FIG. 3.

Further, according to the second example of the conventional throttle valve control device (indicated in Japanese Patent Application Laid Open No. 2005-120897), the shaft center Ma1 of the motor gear Ma and the shaft center Ka1 of drive gear Ka are provided on the same straight line Y-Y, and the shaft center Na1 of the intermediate gear Na is eccentrically provided on the side of the straight line Y-Y. These are illustrated in FIG. 4.

According to the first example of the conventional throttle valve control device, although a side directional length L of the gear part G can be made small, a longitudinal length H of the gear part G becomes large.

This reason is that the shaft center Ma1 of the motor gear Ma, the shaft center Na1 of the intermediate gear Na and the shaft center Ka1 of the drive gear Ka are provided on the same straight line X-X.

On the other hand, according to the second example of the conventional throttle valve control device, although the longitudinal length H of the gear part G can be made smaller than that of the above-described first example, the side directional length L of the gear part G becomes larger than that of the first example.

Such the throttle valve control device is used for a fuel injection device of an internal combustion engine. Further, in recent years especially, a fuel injection device has been applied in a two-wheeled vehicle. So, in the case of using the above-described throttle valve control device, if both the side directional length L and the longitudinal length H of the gear part cannot be made smaller, a degree of freedom for mounting the device on the two-wheeled vehicle is restricted since the two-wheeled vehicle has a limited housing space smaller than that of a four-wheeled vehicle. So, the two-wheeled vehicle is not easily switched to that which use the fuel injection device.

Further, it is considered to make gears of the gear part G to have small pitch circles, that is, more particularly, to make the large diameter gear Nb of the intermediate gear Na and the drive gear Ka to have small pitch circles. However, if these pitch circles are made small, selection of reduction ratio between the motor gear Ma and the drive gear Ka is limited, so that planning of the reduction ratio becomes remarkably hard.

The throttle valve control device according to the present invention solves the above-described problems, and an objective of the present invention is to provide a throttle valve control device having a reduced size and having excellent mountability to a two-wheeled vehicle or the like, in which a side directional length L and a longitudinal length H of a gear part including a motor gear, an intermediate gear and a drive gear can be made small.

Further, another objective of the present invention is to provide a throttle valve control device having a reduced size, in which selection of reduction ratio between a motor gear and a drive gear is remarkably easy.

In order to achieve the above-described objective, a throttle valve control device of the present invention has the following first aspect. The throttle valve control device comprises a throttle body in which an intake passage is provided through therein, and the intake passage is opened/closed by a throttle valve mounted on a throttle valve shaft; a drive gear mounted on an end part of the throttle valve shaft; a motor gear mounted to an end part of an output shaft of a motor; and a intermediate gear formed in two stages with a large diameter gear and a small diameter gear. The motor gear is geared with the large diameter gear of the intermediate gear, and the drive gear is geared with the small diameter gear of the intermediate gear. The large diameter gear of the intermediate gear is formed as an internal gear, and the motor gear is geared with the internal gear which is the large diameter gear.

Further, the throttle valve control device according to the present invention has the following second aspect. The large diameter gear of the intermediate gear is formed to have a bottom part facing a side wall of the throttle body and a cylindrical wall part extending toward the side wall of the throttle body from the bottom part. The internal gear is formed at the inside of the cylindrical wall part.

According to the first aspect of the present invention, rotation of the motor gear is transmitted to the internal gear which is the large diameter gear of the intermediate gear so as to reduce the intermediate gear by one stage. Rotation of the small diameter gear of the intermediate gear which is reduced by the first stage is transmitted to the drive gear so as to be reduced by the second stage. Accordingly, rotation of the motor gear is reduced by two stages so as to rotate the drive gear, and thereby, opening/closing of the throttle valve is gradually controlled by the motor.

Further, more particularly, when the motor gear is geared with the internal gear which is the large diameter gear of the intermediate gear, the longitudinal directional length of the gear part can be shortened corresponding to the diameter of a pitch circle of the motor gear, but the side directional length of the gear part is not increased.

Accordingly, the longitudinal directional length and the side directional length of the gear part can be made small, so that the throttle valve control device having the reduced size can be obtained. Thus, mountability of the device on a two-wheeled vehicle having a limited housing space can be remarkably improved.

Further, the large diameter gear of the intermediate gear does not have a gear at an outer peripheral part thereof, so that it can be prevented to damage the gear when assembling the throttle valve device, mounting the device on a vehicle, carrying out a maintenance operation or the like. So, operability can be remarkably improved.

Further, a gearing part of the internal gear, which is the large diameter gear of the intermediate gear, and the motor gear is a first stage reduction part, and the motor gear is rotated at a comparatively high speed. So, this gearing part is applied with grease so as to be lubricated. Thus, it can be prevented to scatter the grease toward the outer periphery by gearing the motor gear with the internal gear which is the large diameter gear.

Further, the motor is moved toward a center axis of the drive gear mounted on the throttle valve shaft, corresponding to the diameter of the pitch circle of the motor gear, like the motor gear. Thus, the motor can be provided closer toward the intake passage, and a bending moment with respect to the center of the intake passage by the motor can be decreased, so that rigidity at a connection part of the throttle body and the other apparatus can be decreased.

Further, according to the second aspect of the present invention, the large diameter gear is formed with the bottom part facing the sidewall of the throttle body and the cylindrical wall part extending from the bottom part, and the internal gear geared with the motor gear is formed at the cylindrical wall part. Thus, even when the motor gear is rotated at a comparatively high speed so as to scatter the grease, it can be prevented to externally scatter the grease by the bottom part and the cylindrical wall part.

Accordingly, adhering of the grease to a throttle valve open degree sensor or the like can be prevented, where the sensor is fitted and provided at the end part of the throttle valve shaft. So, a stable sensor output can be kept for a long period of time.

DETAILED DESCRIPTION OF PREFERRED EMBODIMENT

Hereinafter, one example of a throttle valve control device according to the present invention is described with FIGS. 1 and 2.

Figure 1:
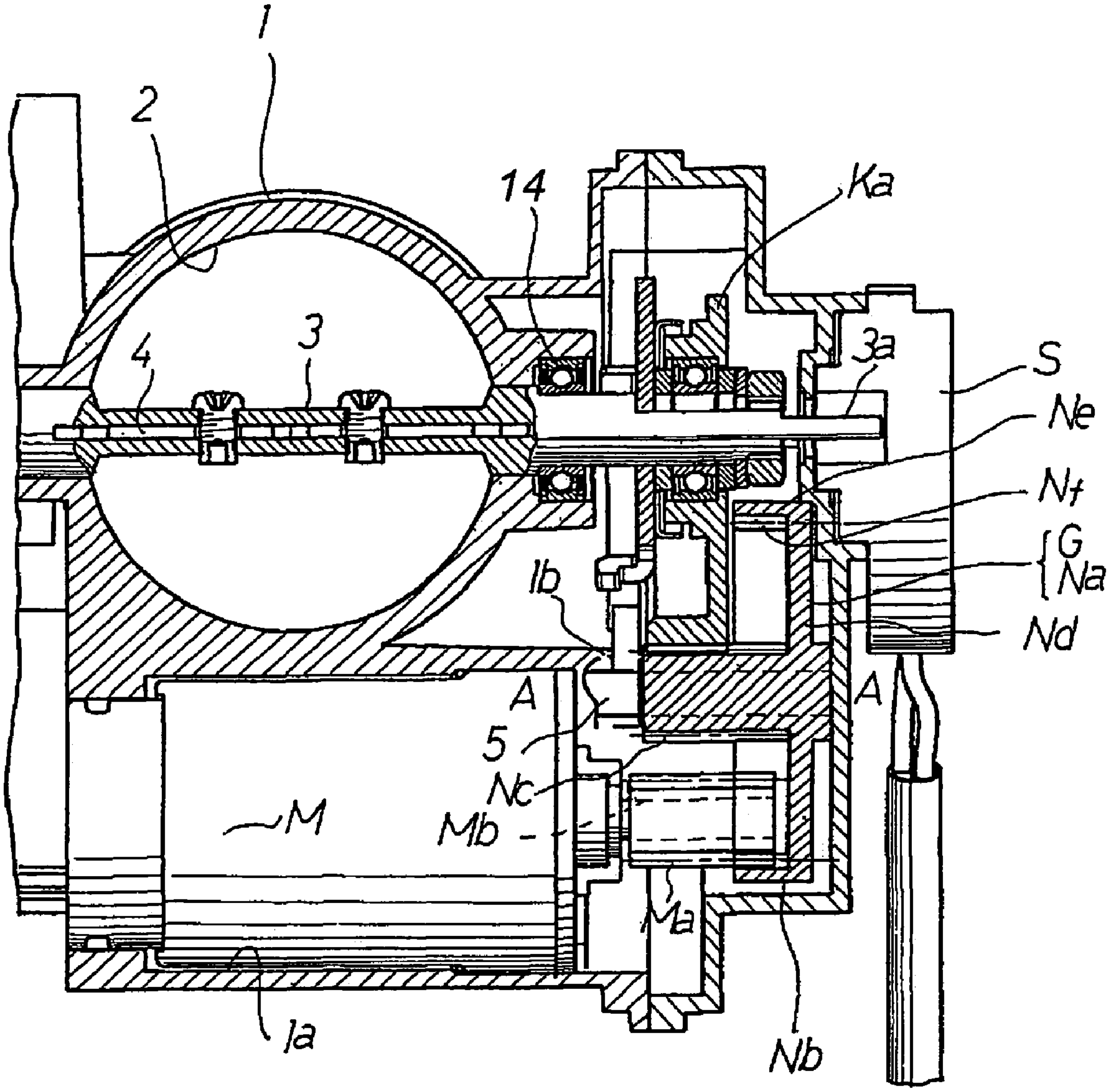
FIG. 1 is a longitudinal sectional view of main parts illustrating one example of a throttle valve control device according to the present invention.
Figure 2:
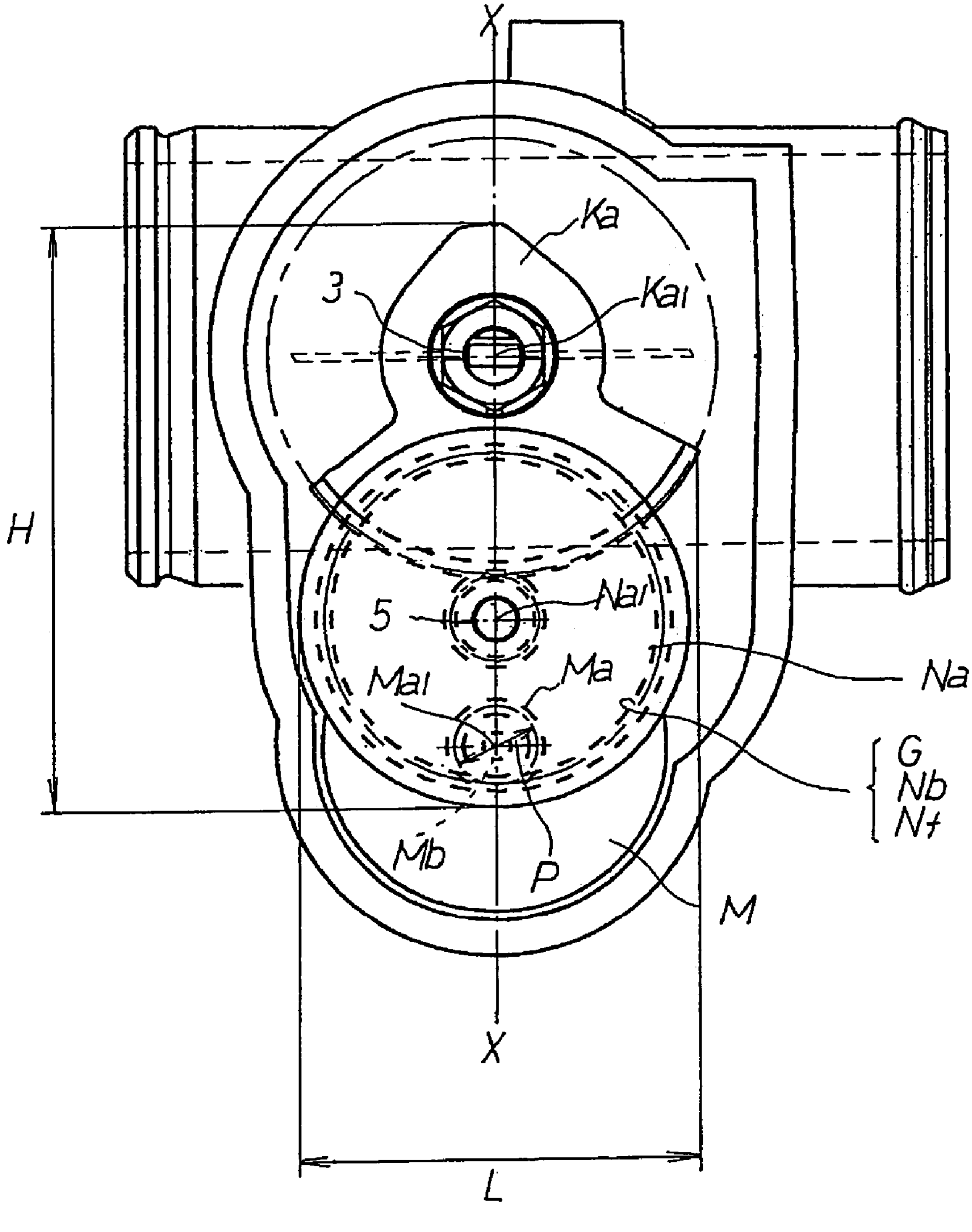
FIG. 2 is a right side view in the state that a cover is removed in FIG. 1.
Figure 3:
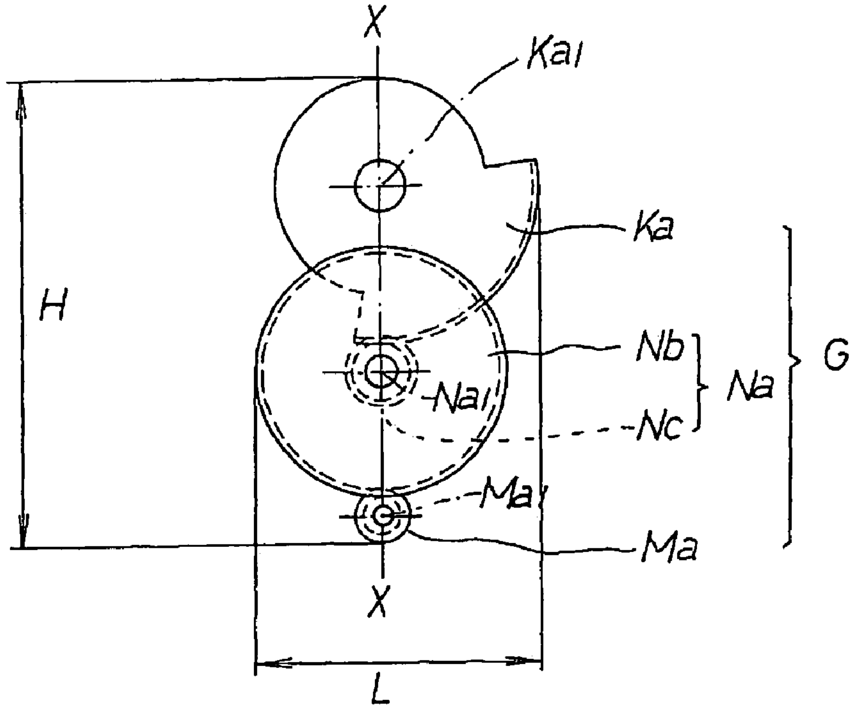
FIG. 3 is a view illustrating an arrangement of a gear part in the first example of a conventional throttle valve control device.
Figure 4:
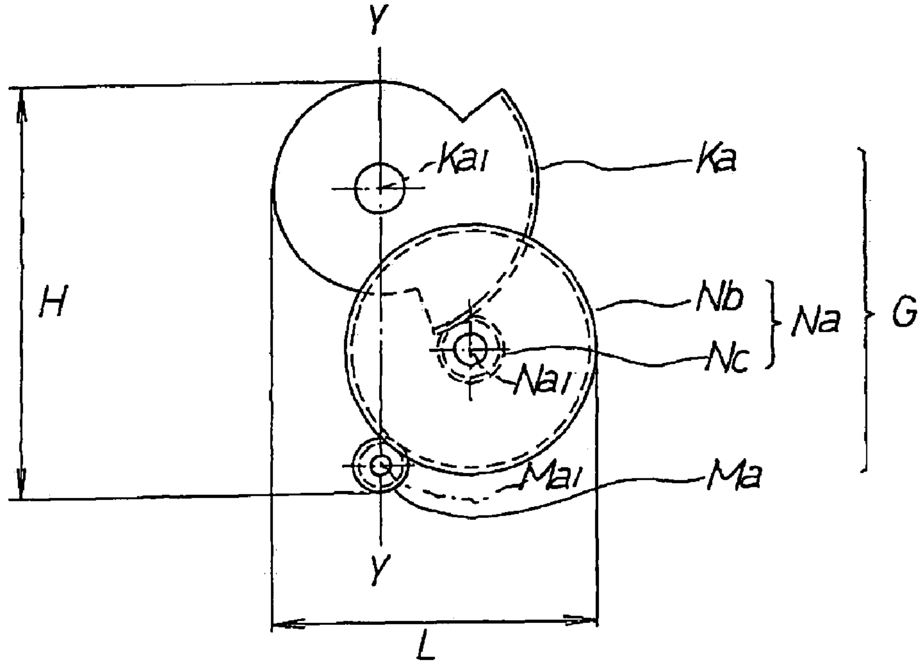
FIG. 4 is a view illustrating an arrangement of a gear part in the second example of a conventional throttle valve control device.

FIG. 1 is a longitudinal sectional view of main parts illustrating a throttle valve control device, and FIG. 2 is a right side view in the state that a cover is removed in FIG. 1.

A throttle body 1 has an intake passage 2, which is provided through therein. In FIG. 2, the right side of the throttle body 1 is connected to an air cleaner through an air conduit, and the left side thereof is connected to an internal combustion engine through an intake pipe. (The air conduit, the air cleaner and the internal combustion engine are not illustrated in the drawings.)

A throttle valve shaft 3 crosses the intake passage 2, and is rotatably supported to the throttle body 1 through a bearing 14. Opening/closing of the intake passage 2 is controlled by a throttle valve 4 screwed to the throttle valve shaft 3.

A motor housing recessed part 1*a* is provided below the intake passage 2 of the throttle body 1, and a motor M is housed and provided in the motor housing recessed part 1*a*.

An output shaft Mb for outputting motor rotation from the motor toward the external is rightward projected in FIG. 1, and a motor gear Ma comprising a spur gear is fixedly mounted on the output shaft Mb.

Accordingly, the motor gear Ma is rotated synchronously with the output shaft Mb of the motor M.

Further, a drive gear Ka comprising a spur gear is mounted near a right end of the throttle valve shaft 3, and the throttle valve shaft 3 and the drive gear Ka are synchronously rotated in a direct or indirect manner.

An intermediate gear Na is rotatably supported by a shaft 5 erected on the throttle body 1, and formed in two stages with a large diameter gear Nb and a small diameter gear Nc, which are formed along a longitudinal axial line A-A of the shaft 5.

The intermediate gear Na is described more concretely. The large diameter gear Nb is formed with a bottom part Nd facing a right side wall 1*b* of the throttle body 1 and a cylindrical wall part Ne extending leftward (toward the right side wall 1*b*) from the bottom part Nd. Further, an internal gear Nf is formed at the inside of the cylindrical wall part Ne along the whole circumference.

Further, the small diameter gear Nc of the intermediate gear Na is formed coaxially with the large diameter gear Nb, and is formed on the left side of the large diameter gear Nb.

Accordingly, the intermediate gear Na is formed in two stages with the large diameter gear Nb having the internal gear Nf and the small diameter gear Nc, along the longitudinal axial line A-A of the shaft 5.

Further, the motor gear Ma is geared with the internal gear Nf which is the large diameter gear Nb of the intermediate gear Na, and the drive gear Ka is geared with the small diameter gear Nc of the intermediate gear Na.

In addition, in such the arrangement of the gear part, a shaft center Ma1 of the motor gear Ma, a shaft center Na1 of the intermediate gear Na including the large diameter gear Nb and the small diameter gear Nc, and a shaft center Ka1 of the drive gear Ka are provided on the same straight line X-X.

The arrangement of the gear part is illustrated in FIG. 2.

In addition, an angle sensor S is provided for detecting a rotation angle of the throttle valve shaft 3. The angle sensor S is fitted and connected to a flat face part 3*a* at a right end of the throttle valve shaft 3, is rotated synchronously with the throttle valve shaft 3, and outputs a signal corresponding to the rotation angle of the throttle valve shaft 3.

Then, an operation of the throttle valve control device is described.

The motor M is rotated corresponding to an output signal from an ECU which is not illustrated in the drawings, and the motor gear Ma is rotated synchronously with rotation of the output shaft Mb of the Motor M.

Further, the motor gear Ma is geared with the internal gear Nf which is the large diameter gear Nb of the intermediate gear Na, and rotation of the motor gear Ma is reduced by the first stage by the large diameter gear Nb. Further, the small diameter gear Nc of the intermediate gear Na, the rotation of which is reduced by the first stage as described above, is geared with the drive gear Ka, and rotation of the intermediate gear Na is reduced by the second stage by the drive gear Na.

As described above, rotation of the motor M is reduced in two stages with the motor gear Ma, the large diameter gear Na and the small diameter gear Nb constituting the intermediate gear Na, and the drive gear Nc. The throttle valve shaft 3 rotated synchronously with the drive gear Nc is rotated at reduced speed corresponding to the rotation of the motor M. Thereby, the throttle valve 4 controls opening/closing of the intake passage 2 corresponding to the rotation of the motor M.

Further, according to the throttle valve control device of the present invention, the motor gear Ma is provided so as to be geared with the internal gear Nf which is the large diameter gear Nb of the intermediate gear Na. Further, the shaft center Ma1 of the motor gear Ma, the shaft center Na1 of the intermediate gear Na including the large diameter gear Nb and the small diameter gear Nc, and the shaft center Ka1 of the drive gear Ka are provided on the same straight line X-X. Thereby, the following excellent effect can be obtained.

Since the motor gear Ma is geared with the internal gear Nf which is the large diameter gear Nb, the motor gear Ma can be moved toward the throttle valve shaft 3 (upward in FIG. 1) corresponding to the diameter P of the pitch circle of the motor gear Ma, and thereby, the longitudinal directional length H of the gear part G can be shortened corresponding to the diameter P of the pitch circle of the motor gear Ma. On the other hand, the side directional length L of the gear part G is not increased.

Accordingly, the longitudinal directional length H and the side directional length L of the gear part G can be made small, and thereby, the throttle valve control device can be reduced in size. Thus, mountability to a two-wheeled vehicle, a three-wheeled vehicle or the like having a limited housing space can be remarkably improved.

In the above-described device, as for respective pitch circles of the motor gear Ma, the large diameter gear Nb and the small diameter gear Nc constituting the intermediate gear Na, and the drive gear Ka, the same diameters as those of the conventional device can be selected. Further, selection of the reduction ratio by the motor part G can be freely and most-suitably carried out.

Further, as described above, the motor M can be also moved toward the throttle valve shaft 3 (that is, toward the center of the intake passage 2) corresponding to the diameter P of the pitch circle of the motor gear Ma, like the motor gear Ma. Thereby, a bending moment with respect to the center of the intake passage 2 by the motor M can be reduced, so that rigidity at the connection part of the end part of the throttle body 1 with the air conduit and the intake pipe can be reduced. Thus, it is preferable from a view point of vibration resistance in the case of mounting the device on a two-wheeled vehicle or a three-wheeled vehicle which have a hard vibration condition.

Further, since the internal gear Nf is provided in the large diameter gear Nb, the gear is not exposed at the outer peripheral part of the large diameter gear Na. Thus, even when external force is added at the time of assembling the throttle valve control device and carrying out the maintenance operation of it, the gear is not damaged, so that the operability can be remarkably improved.

Furthermore, the gearing part of the motor gear Ma and the internal gear Mf which is the large diameter gear Nb, is applied with the grease so as to be lubricated. Since the rotation of motor gear Ma itself before the first stage reduction is a comparatively high speed, the grease is scattered at the gearing part. However, this scattering of the grease can be prevented by the bottom part Nd and the cylindrical wall part Ne of the large diameter gear Nb, so that scattering of the grease toward the external of the large diameter gear can be prevented. Accordingly, adhering of the grease to the angle sensor S can be prevented, and such is preferable for keeping stable output property of the angle sensor for a long period of time.

Further, the gearing part of the motor gear Ma and the internal gear Nf are surrounded by the bottom part Nd and the cylindrical wall part Ne of the large diameter gear Nb. Thus, it can be prevented to emit a gearing noise generated in the gearing part toward the external. So, it is preferable in a two-wheeled vehicle in which the throttle body is provided close to a rider.

In the above-described example, the present invention is applied to the throttle body. In a tandem valve type throttle body in which a throttle valve is provided at the downstream side of an intake passage and a sub-throttle valve is provided at the upstream side from the throttle valve of the intake passage, the present invention can be applied to a gear part between a motor and the sub-throttle valve.

What is claimed is:

1. A throttle valve control device comprising:

a throttle body, in which an intake passage is provided through therein and the intake passage is opened/closed by a throttle valve mounted on a throttle valve shaft; a drive gear mounted on an end part of the throttle valve shaft;

a motor gear mounted to an end part of an output shaft of a motor; and a intermediate gear formed in two stages with a large diameter gear and a small diameter gear, in which the motor gear is geared with the large diameter gear of the intermediate gear, and the drive gear is geared with the small diameter gear of the intermediate gear;

wherein a large diameter gear of an intermediate gear is formed as an internal gear, and the motor gear is geared with the internal gear which is the large diameter gear.

2. The throttle valve control device as claimed in claim 1, wherein the large diameter gear of the intermediate gear is formed to have a bottom part facing a side wall of a throttle body and a cylindrical wall part extending toward the side wall of the throttle body from the bottom part, and the internal gear is formed at the inside of the cylindrical wall part.

* * * * *